(12) United States Patent
Olsen

(10) Patent No.: US 9,428,313 B2
(45) Date of Patent: Aug. 30, 2016

(54) ADJUSTABLE CONTAINER HOLDER

(71) Applicant: HONDA MOTOR CO., LTD., Tokyo (JP)

(72) Inventor: Douglas M. Olsen, Marysville, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 212 days.

(21) Appl. No.: 14/256,304

(22) Filed: Apr. 18, 2014

(65) Prior Publication Data

US 2015/0298592 A1    Oct. 22, 2015

(51) Int. Cl.
*B65D 63/10* (2006.01)
*B60N 3/10* (2006.01)

(52) U.S. Cl.
CPC ............ *B65D 63/10* (2013.01); *B60N 3/106* (2013.01); *B60N 3/108* (2013.01)

(58) Field of Classification Search
CPC .......... B60N 3/10–3/108; B60R 9/02; B60R 9/048; B65D 63/10
USPC ........................................................ 224/926
See application file for complete search history.

(56) References Cited

U.S. PATENT DOCUMENTS

| 4,629,153 A | 12/1986 | Marcum |
| 4,767,092 A | 8/1988 | Weatherly |
| 4,819,843 A | 4/1989 | Nakayama |
| D303,057 S | 8/1989 | Smith |
| 4,951,910 A | 8/1990 | March |
| 4,984,722 A | 1/1991 | Moore |
| 5,509,633 A | 4/1996 | Ruster et al. |
| D399,395 S | 10/1998 | Persons |
| 5,833,194 A | 11/1998 | Jones et al. |
| 5,952,218 A * | 9/1999 | Lee .......................... C12M 23/08 211/74 |
| 6,098,860 A | 8/2000 | Phillips |
| 6,264,154 B1 * | 7/2001 | Hiscox .................... B60N 3/101 224/560 |
| 6,637,709 B1 | 10/2003 | Guenther et al. |
| 7,090,183 B2 | 8/2006 | Heybl et al. |
| D570,162 S | 6/2008 | Blais |
| 8,360,380 B2 | 1/2013 | Soma et al. |
| D688,537 S | 8/2013 | Napoli |

(Continued)

FOREIGN PATENT DOCUMENTS

| DE | 102011004507 A1 | 8/2012 |
| GB | 2326141 A | 12/1998 |
| GB | 2331737 A | 6/1999 |
| GB | 2396341 B | 3/2005 |
| JP | 2006224961 | 8/2006 |

OTHER PUBLICATIONS

Mima Cup Holder w/Clip for Flair (printed from website), travelingtikes.com, 2 pp.

(Continued)

*Primary Examiner* — Justin Larson
*Assistant Examiner* — Phillip Schmidt
(74) *Attorney, Agent, or Firm* — Kenealy Vaidya LLP

(57) ABSTRACT

A container holder assembly for a vehicle having a base wall and a sidewall defining a substantially cylindrical cavity. The cavity having a first side half and an opposed second side half. A resilient member extending across the cavity. The sidewall including a plurality of spaced slots and the resilient member including a first end attached to the sidewall at the first side half of the cavity and a free end configured to penetrate a selected one of the spaced slots for releasable attachment to the sidewall. The resilient member being configured to deform upon insertion of a container into the cavity.

16 Claims, 4 Drawing Sheets

(56) References Cited

U.S. PATENT DOCUMENTS

| | | | |
|---|---|---|---|
| 8,556,116 B2 | 10/2013 | Bergman et al. | |
| 2004/0020954 A1* | 2/2004 | Gates | B60R 9/048 224/442 |
| 2009/0095865 A1* | 4/2009 | Everhart | B60N 3/105 248/309.1 |
| 2009/0159623 A1* | 6/2009 | Kreutmayr | B60R 7/04 224/282 |
| 2011/0074173 A1* | 3/2011 | Gaudig | B60R 7/04 296/24.34 |
| 2012/0187169 A1 | 7/2012 | Osten et al. | |
| 2013/0062382 A1 | 3/2013 | Alford | |

OTHER PUBLICATIONS

Slim-Grip Ultra Quick Release Strap Mount (printed from website), www.arkon.com/Slim-GripUltra, 5 pp.
T-H Marine RoboCup Claim-on Cup and Rod Holder (printed from website), www.academy.com, 2 pp.
BCS Patented F1 Swivel Beverage Can Cup Holder (printed from website), www.polyperformance.com, 2 pp.

* cited by examiner

ADJUSTABLE CONTAINER HOLDER

BACKGROUND

The present exemplary embodiment relates to an adjustable container holder. It finds particular application as a holder configured to retain a drink container such as a cup. It may have particular significance for use in a multi-utility vehicle (MUV), an all terrain vehicle (ATV), or a side by side vehicle (SxS) that frequently encounter rough terrain. However, it is to be appreciated that the present exemplary embodiment is also amenable to other types of vehicles and applications.

Most vehicles include a cup holder as a standard feature. These cup holders typically comprise an open chamber configured to receive a bottom portion of a cup or other drinking vessel. As will be appreciated, a container holder for a vehicle, such an MUV, ATV and/or SxS, in particular, must provide a secure retention for the container. It is also desirable to have a cup holder that is capable of firmly grasping drinking vessels of more than one size. However, many do not present structure for adjusting the size of the container. As a result, these types of holders cannot accommodate larger containers and do not provide adequate support to smaller containers.

In this regard, beverage container holders can include a container well, an adjustable wall and a spacer element wherein the adjustable wall is adjustably coupled with the holder body in a spanning relationship with the well for selectively altering the span of the well in order to support and retain differently sized containers.

Existing holders disclose various techniques for adjusting the size of the container well. These include structures which shift the sidewalls with the bottom wall or base. Other types include inwardly extending flexible fingers designed to conform to the shape of a beverage container and provide sufficient support. These and other existing cup holders tend to be marginally effective in use or mechanically complex leading to increased manufacturing cost.

Accordingly, there is a long standing need for a container retention device for vehicles which incorporates the features of flexibility, adjustability, adaptability, and low cost.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, a container holder assembly for a vehicle is provided. The holder is constructed of a first member which defines a cavity and a resilient member adapted to extend across the cavity. The resilient member dissects the cavity and is configured to deform upon insertion of a container into the cavity. The first member includes a perimeter wall defining a plurality of spaced passages. The resilient member has a fixed end and a free end, the free end being adapted to penetrate a selected one of the spaced passages for releasable attachment to an outer surface of the perimeter wall.

According to a second embodiment, a cup holder assembly is provided. The assembly includes a cup receiving portion having a bottom wall and at least one sidewall extending upwardly from the bottom wall. The cup receiving portion defines a cavity. A resilient member adapted to extend across the cavity is also provided. The resilient member dissects the cavity and is configured to deform upon insertion of the cup into the cavity. The sidewall includes a plurality of spaced resilient member receiving passages. The resilient member includes at least one free end adapted to releasably mate with a selective one of the resilient member receiving passages.

According to a further embodiment, a container holder assembly is provided. The holder includes a base wall and a sidewall defining a substantially cylindrical cavity. The cavity has a first side half and an opposed second side half. A resilient member having a first end attached to the sidewall at the first side half of the cavity and a free end adapted to extend across said cavity to the second side half is also provided. The sidewall includes a plurality of spaced passages, the free end being configured to penetrate a selected one of the spaced passages for releasable attachment to the sidewall.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated samples, however, are not exhaustive of the many possible embodiments of the disclosure. Other advantages and novel features of the disclosure will be set forth in the following detailed description of the disclosure when considered in conjunction with the drawings, in which.

The drawings described herein are for illustration purposes only and are not intended to limit the scope of the present disclosure in any way.

DETAILED DESCRIPTION

Embodiments of the invention will be described hereinafter with reference to the accompanying drawings. In this detailed description reference is made to the accompanying drawings, which form a part hereof, and within which are shown by way of illustration specific embodiments by which the invention may be practiced. It is to be understood that other embodiments may be utilized and structural changes may be made without departing from the scope of the disclosure.

Figure 1:
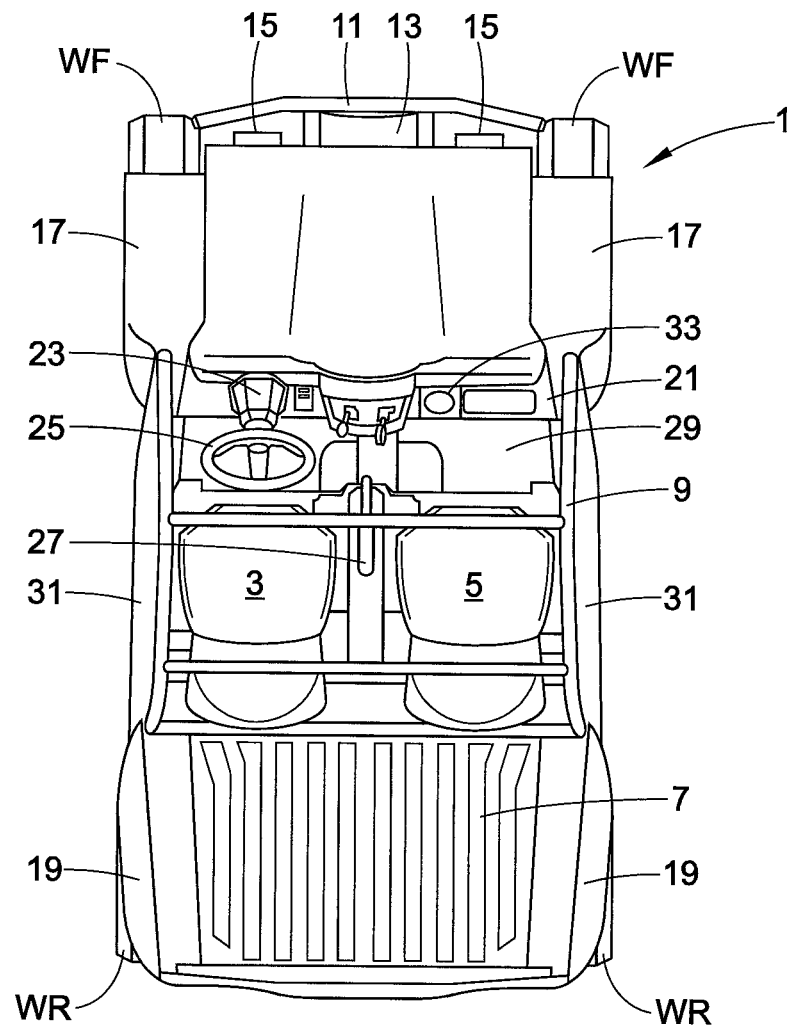
FIG. 1 is a top plan view of an MUV vehicle.
Figure 2:
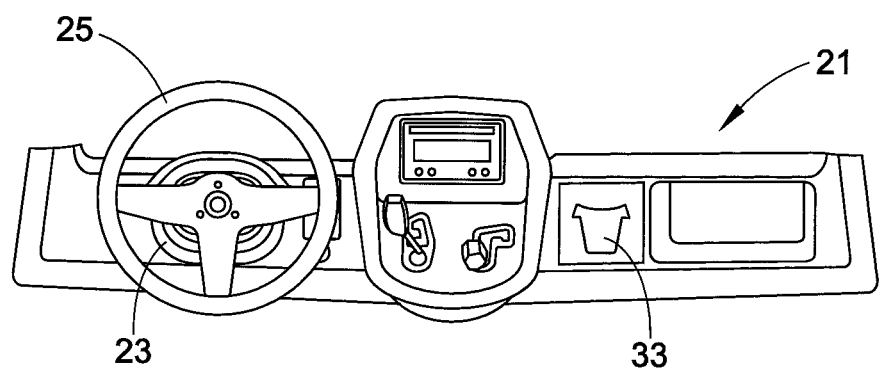
FIG. 2 is a schematic illustration of an MUV dashboard including a container holder according to a first embodiment of this disclosure.
Figure 3:
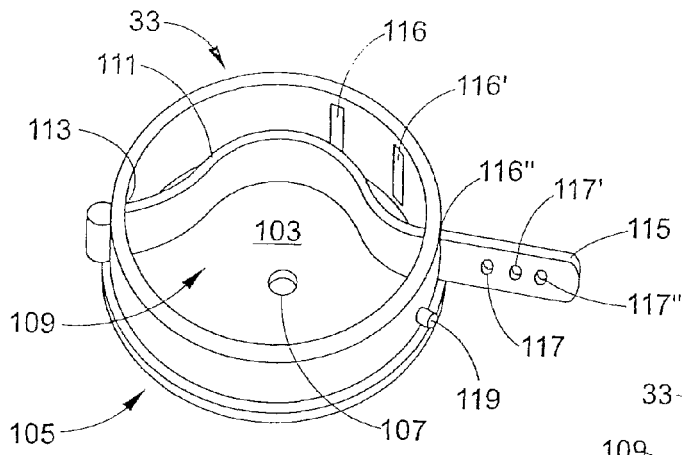
FIG. 3 is a perspective view of the container holder of FIG. 2.
Figure 4:
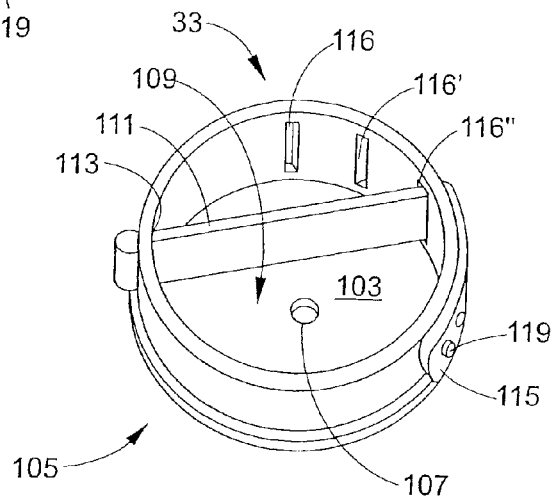
FIG. 4 is a perspective view of the container holder of FIG. 3 with the retaining strap secured.

Referring now to FIGS. 1 and 2, a four-wheeled MUV vehicle 1 is depicted. Many of the referenced elements are described but are not illustrated. However, these elements are not critical to the understanding of the container holder of the present disclosure. Rather, these elements are provided in the description to explain the general construction of an MUV. A chassis of the MUV 1 is constructed by assembling a plurality of steel pipes. An engine is mounted to the chassis. A pair of left and right front wheels WF and a pair of left and right rear wheels WR are supported by respective suspension arms and by the chassis via a front wheel shock absorber and a rear wheel shock absorber, respectively.

A seat frame is joined to the chassis to support a driver's seat 3 and a passenger's seat 5. A rear frame for supporting a rear deck 7 is joined to the chassis at a position upward and rearward of the seat frame. A roll-over bar 9 is joined to the upper portion of the chassis to protect an occupant's sitting space. A bumper 11 is joined to a vehicle body front end portion of the chassis.

A front cover 13 including a pair of left and right headlamps 15 is disposed rearward and upward of the bumper 11. Front fenders 17 are installed on the vehicle widthwise left and right of the front cover 13 so as to cover from above the front steering wheels WF. Rear fenders 19 are installed on the vehicle widthwise left and right and above the rear wheels WR.

An instrument panel 21 and a steering wheel column 23 are installed on the vehicle body in front of the driver's seat 3 and passenger's seat 5. Meters and gauges, an operating lever and the like are disposed at the vehicle widthwise center of the instrument panel 21. The steering wheel column 23 covers a steering shaft of the steering wheel 25. A parking brake lever 27 is disposed between the driver's seat 3 and the passenger's seat 5. A floor panel 29 is formed forward of and below the parking brake lever 27 so as to cover the reinforcing pipe, a drive shaft, etc. Doors 31 are installed on each side of the vehicle widthwise outside of each of the driver's seat 3 and the passenger's seat 5 so as to pivot around the vehicle body front side.

The instrument panel 21 is further equipped with at least one container holder 33. The container holder 33 can be integrally formed as a component of the instrument panel 21, or may comprise an insert that can be installed in a chamber integrally formed on the instrument panel, or may be a body including a clip member suitable for selective attachment to a corresponding attachment point on the instrument panel. The illustrated embodiment is a container holder 33 including a clip element (see FIG. 14) configured to be received within a protruding slot integrally formed in the instrument panel 21. Of course, the container holder 33 can form a component of other constituents of a vehicle such as a center console, doors, walls, or any other location contemplated by the skilled artisan.

Turning now to FIGS. 3-6 and 14-15, the container holder 33 is depicted in greater detail. The container holder 33 includes a base wall 103 from which a sidewall 105 extends. A drain hole 107 can be provided in base wall 103. Base wall 103 and sidewall 105 cooperate to form a receptacle 109. Receptacle 109 is configured to receive a container, providing vertical support via bottom wall 103 and horizontal support via sidewall 105. Sidewall 105 can be slightly inwardly canted as it approaches the base wall 103 (see FIGS. 14 and 15) to provide improved registration of a container, such as a cup, inserted within the receptacle 109.

Sidewall 105 in the depicted embodiment is substantially cylindrical but alternative configurations are also contemplated. For example, a multi-sided shape such as pentagon or hexagon would be suitable. Similarly, it is envisioned that the sidewall can include one or more discontinuous regions where material has been removed to reduce weight. Moreover, any shape capable of receiving and retaining a generally cylindrical container is acceptable. Particularly, the shape of the receptacle 109 should be suitable for receiving containers such as cups, cans, and bottles which may contain beverages or other materials such as propane.

Figure 6:
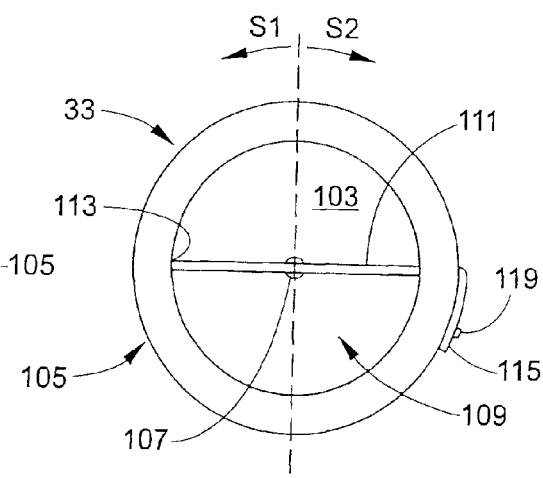
FIG. 6 is a top plan view of the container holder of FIG. 4.

A retention strap 111 is provided and extends between a first side S1 of the receptacle and a second side S2 of the receptacle (see FIG. 6). Strap 111 can include a first fixed end 113 secured to side S1 of the sidewall 105 and a second free end 115. The phrase "free end" is intended to reflect its ability to selectively rotate unrestricted about the fixed end 113.

Side S2 of the sidewall 105 can include a plurality of passages 116, 116' and 116". These passages are depicted herein as slots, but the disclosure is not limited to this configuration. Rather, any shape suitable for accommodating passage of the strap is acceptable. In fact, the passage shape may be modified based on the shape of the selected strap. For example, circular passages may be employed with a cylindrical strap.

In this regard, although depicted herein as a strap, it is envisioned that any flexible member such as a cord, line, strip, band, arm, etc. could provide a viable alternative. Moreover, any element having the ability to flex laterally and to be stretched longitudinally is considered functional for this purpose. Advantageously, the material forming the element may also provide a high degree of surface friction with a container inserted into cavity 109. In this regard, an elastomeric material, such as a rubber or thermoplastic elastomeric may have particular benefit.

Strap 111 can be secured to the sidewall 105 as a component integrally secured thereto by, for example, co-extrusion, adhesive, or melt attachment, etc. or by a mechanical attachment such as a clasp, hook, buckle, etc. or in the manner depicted in FIG. 13 and described hereinbelow.

The free end 115 of the strap 111 is sized such that it can be passed through slots 116, 116' and 116". Free end 115 can include a plurality of holes 117, 117' and 117" configured to mate with a post 119 disposed on an outer surface of the sidewall 105.

Figure 5:
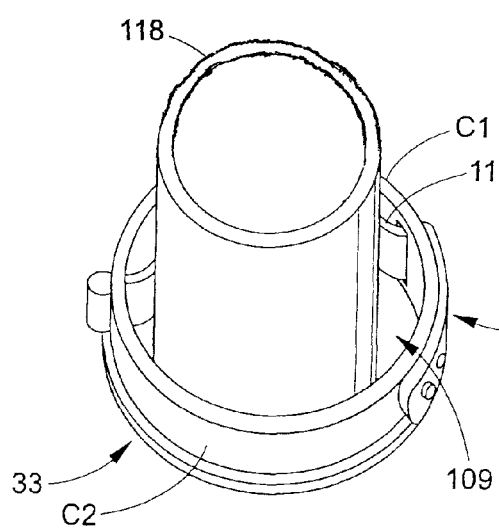
FIG. 5 is a perspective view showing a container in the container holder of FIG. 4.

With particular reference to FIG. 5, it can be seen that when a container 118 is placed within the container holder 33, it abuts the container holder 33 at a minimum of three points. These include at least a first position C1 where it abuts the strap 111, a second position C2 where it abuts the sidewall 105 and a third position C3 (not shown) where it abuts the base wall 103. The container 118 is thereby supported at three spaced apart positions and securely held within the container receptacle 109.

By providing the sidewall 105 with a plurality of slots 116, 116' and 116" and the strap 111 with a plurality of holes 117, 117' and 117" the point at which the receptacle 109 is dissected can be modified by an operator. FIG. 6 provides a top plan view demonstrating the receptacle can be bisected to reduce its volume available for receiving a container. Alternatively, it can be envisioned that strap 111 secured through slot 116' provides a slightly larger area for insertion, and that strap 111 secured through slot 116 provides an even larger area for container insertion. Furthermore, since strap 111 is flexible, if the free end 115 is not secured, strap 111 can conform to the shape of the cavity 109 and allow a container substantially of the same dimensions of the cavity 109 to be received.

From an alternative perspective, the area available for insertion of a container can also be minimized by using the smaller dimensioned side of the strap 111 when either slot 116 or 116' is employed. Of course, the present disclosure is not limited to only three slots or the particular dispersion of slots as illustrated.

In short, the capacity of receptacle 109 can be modified. The container holder can therefore support, in an effective and stable manner, containers of greatly varying size and in each case a three point of contact support system is provided. The minimum size of container that can be supported is that which is so small that it barely extends the strap 111 and the largest size container that can be accommodated is that which matches the diameter of the cavity 109.

Advantageously, a flexible stretchable strap 111 having multiple attachment holes (117) in combination with the multiple points of receptacle dissection via slots (116) provides a highly adjustable container holder that can accommodate widely divergent sized containers and provide a wide range of varying compressive forces on the container being retained. In this regard, not only can the area available for container insertion be adjusted but so can the tension in the strap. This is beneficial when different materials (e.g. styrofoam vs. metal) are used to form the container and to account for the type of terrain being encountered (e.g. rough vs. smooth) by the vehicle.

Figures 14, 15:
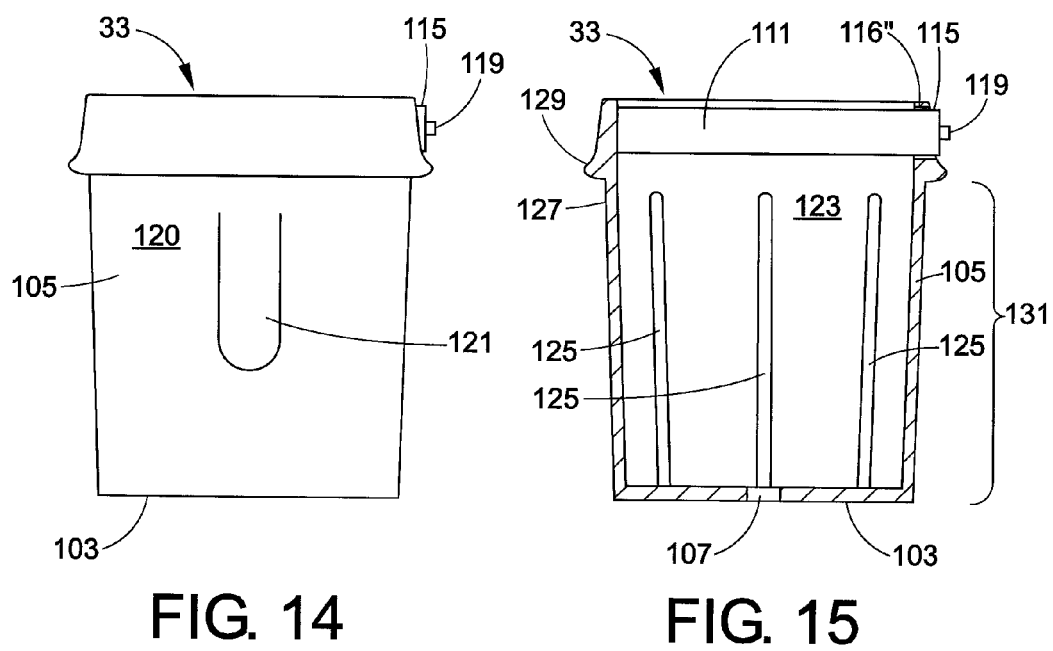
FIG. 14 is a side elevation view of the container holder of FIG. 4.
FIG. 15 is a cross-section view of FIG. 14.

Turning to FIG. 14, the exterior surface 120 of sidewall 105 of the container holder 33 can be equipped with a clip member 121 to facilitate its attachment to a portion of the vehicle. Although a simple hook type clip member is depicted, it is envisioned that any type of apparatus suitable for joining the container holder 33 to another surface could be employed.

With reference to FIG. 15, an internal surface 123 of the container holder sidewall 105 can be equipped with a plurality of reinforcement ribs 125. Furthermore, the outer surface 127 of the container holder can be provided with a shoulder 129 which can facilitate the association of the container holder 33 within a chamber formed on the associated vehicle. More particularly, a chamber can be formed in the vehicle to have a diameter sized to receive a lower body portion 131 of the container holder 33 and include an edge sized to mate with shoulder 129.

Figure 7:
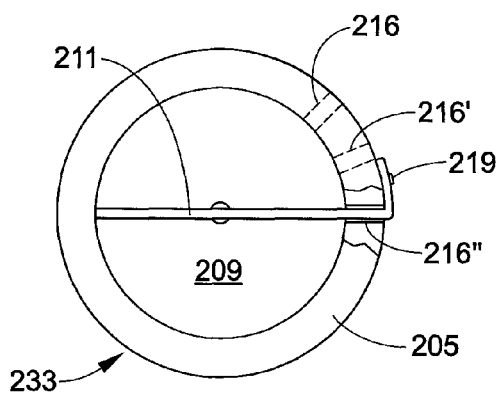
FIG. 7 is a top plan view of a second configuration of a container holder.
Figure 8:
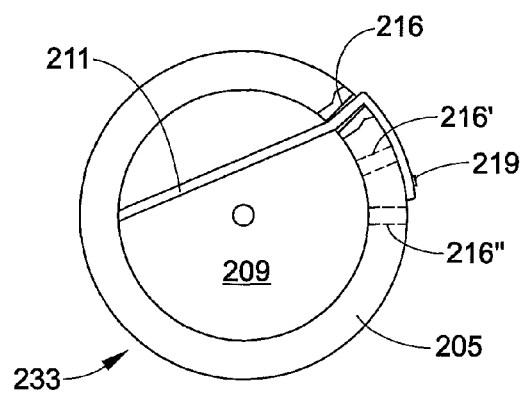
FIG. 8 is a top plan view of the container holder of FIG. 7 with the retaining strap in a second position.

Turning now to FIGS. 7 and 8, an alternative container holder 233 is provided to demonstrate that a post 219 can be positioned at an alternative location such as between adjacent slots to allow a relatively shorter strap 211 to extend across cavity 209 to an opposed exterior surface of the container sidewall 205. Particularly, by positioning post 219 between slots 216' and 216". In this design, the strap 211 does not need sufficient length to extend beyond slot 216" when inserted through slots 216 or 216'. It is noted that slots are shown in hatching for illustration purposes.

Figure 9:
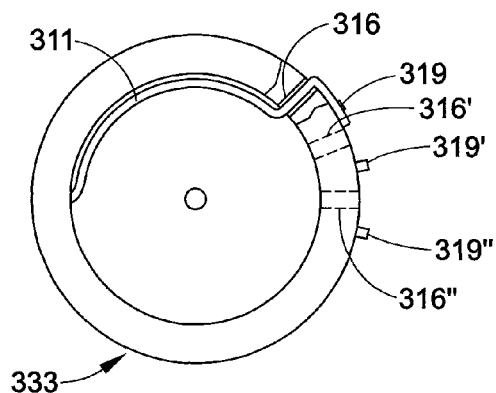
FIG. 9 is a top plan view of a third configuration of a container holder.
Figure 10:
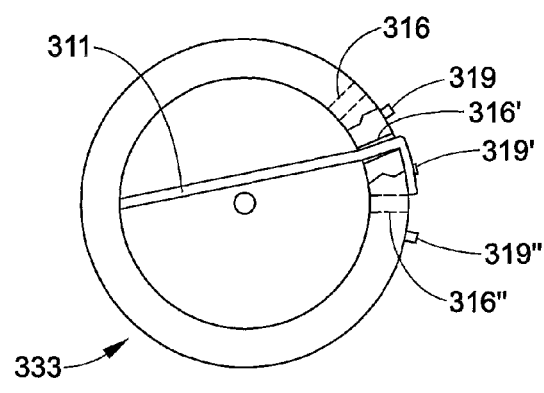
FIG. 10 is a top plan view of the container holder of FIG. 9 with the retaining strap in a second position.
Figure 11:
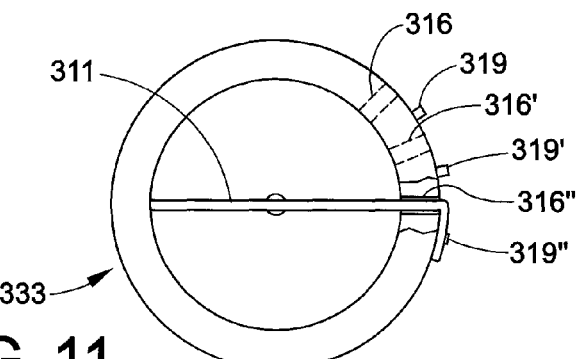
FIG. 11 is a top plan view of the container holder of FIG. 9 with the retaining strap in a third position.

With reference to FIGS. 9-11, an further alternative configuration is depicted wherein a plurality of posts 319, 319' and 319" are provided adjacent corresponding slots 316, 316' and 316". This is an alternative configuration that allows for strap 311 to have an even shorter dimension yet retain its adjustability.

Figures 12, 13:
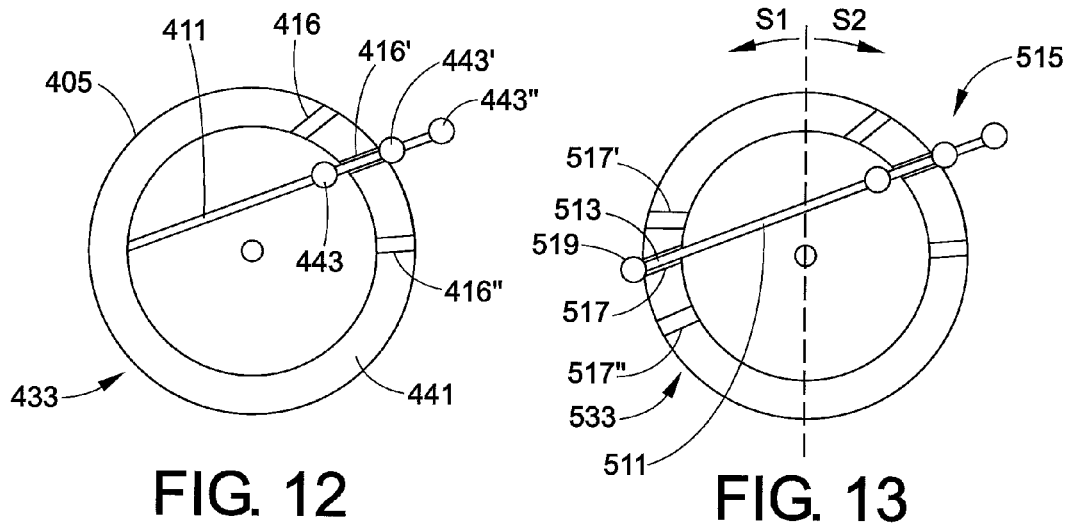
FIG. 12 is a top plan view of a fourth configuration of a container holder.
FIG. 13 is a top plan view of a fifth configuration of a container holder.

Turning next to FIG. 12, an alternative configuration of a container holder 433 is depicted. Container holder 401 includes slots 416, 416' and 416" which extend from a top edge 441 of the container holder sidewall 405 such that strap 411 can be inserted into a selected slot from above. Strap 411 is equipped with a plurality of protruding shoulder elements 443, 443' and 443". The shoulder elements are provided to facilitate the horizontal securement of the strap 411 within a selected passage 416, 416' and 416". The shoulder elements 443, 443' and 443" can be utilized to provide the appropriate amount of tension in the strap element as required for the intended container being secured.

Turning next to FIG. 13, an embodiment of a container holder 533 is depicted wherein the "fixed end", in this case a first end 513 of the strap 511 is secured to the sidewall via an open top slot 517 and a corresponding shoulder element 519. Furthermore, strap 511 is adjustable at the first side of the cavity S1 by the inclusion of a plurality of additional slots 517' and 517". The free end 515 of the strap 511 is equipped with multiple shoulder elements as described with respect to FIG. 12 to provide additional adjustability.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A container holder assembly for a vehicle, the holder assembly comprising:
a first member which defines a cavity and a resilient member adapted to extend across said cavity, said first member including a perimeter wall defining a plurality of spaced passages, said resilient member including a fixed end and a free end, said free end adapted to penetrate a selected one of said spaced passages for releasable attachment to an outer surface of said perimeter wall, the resilient member dissecting said cavity and configured to deform upon insertion of a container into the cavity, the outer surface of said perimeter wall including a projection configured to receive the free end of the resilient member, and the free end of the resilient member including a plurality of holes configured to receive the projection.

2. The holder assembly of claim 1 wherein said resilient member comprises a strap and said passages comprise slots.

3. The holder assembly of claim 2 wherein said strap consists essentially of rubber or thermoplastic elastomer.

4. The holder assembly of claim 1 wherein said perimeter wall is at least generally circular in cross-section.

5. The holder assembly of claim 1 wherein the free end of the resilient member includes at least one shoulder configured to interact with an outer edge of at least one of said passages to prevent said strap from passing through the associated passage and into the cavity.

6. The holder assembly of claim 1 wherein the fixed end of the resilient member is integrally formed with the first member.

7. The holder assembly of claim 1 wherein the outer surface of the perimeter wall includes multiple projections.

8. The holder assembly of claim 1 wherein said holder assembly is removable from said vehicle.

9. The holder assembly of claim 8 wherein said holder assembly includes a clip element configured for attachment to the vehicle.

10. The holder assembly of claim 1 wherein said vehicle is selected from one of an MUV, ATV and S×S.

11. A cup holder assembly, comprising:

a cup receiving portion, said cup receiving portion including a bottom wall and at least one sidewall extending upwardly from the bottom wall, said bottom wall and said at least one sidewall defining a cavity, a resilient member adapted to extend across said cavity, the resilient member dissecting said cavity and configured to deform upon insertion of a container into the cavity, said sidewall including a plurality of spaced resilient member receiving passages, said resilient member including at least one free end adapted to releasably mate with a selective one of the resilient member receiving passages, an outer surface of said at least one sidewall including a projection configured to receive the at lease one free end of the resilient member, and the at least one free end of the resilient member including a plurality of holes configured to receive the projection.

12. The cup holder assembly of claim 11 wherein said resilient member includes an end opposed to the free end, said opposed end being integrally attached to said sidewall.

13. The cup holder assembly of claim 11 wherein said resilient member includes an end opposed to the free end, said opposed end being removably attached to said sidewall.

14. The cup holder of claim 11 wherein said sidewall defines an at least substantially cylindrical cavity.

15. A container holder assembly the holder, comprising:

a base wall and a sidewall defining a substantially cylindrical cavity, said cavity having a first side half and an opposed second side half, a resilient member including a first end attached to the sidewall at the first side half of the cavity and a free end adapted to extend across said cavity to the second side half, said second side half of the sidewall including a plurality of spaced passages, said free end configured to penetrate a selected one of said spaced passages for releasable attachment to the sidewall, an outer surface of said sidewall including a projection configured to receive the free end of the resilient member, and the free end of the resilient member including a plurality of holes configured to receive the projection.

16. The holder assembly of claim 15 wherein said resilient member comprises a strap.

* * * * *